United States Patent
Trapani

(10) Patent No.: US 12,058,120 B2
(45) Date of Patent: Aug. 6, 2024

(54) MULTI-CUSTOMER ELECTRONIC ACCESS CONTROL SYSTEM AND METHOD

(71) Applicant: Security Enhancement Systems, LLC, Northbrook, IL (US)

(72) Inventor: Matthew Frank Trapani, Deerfield, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 441 days.

(21) Appl. No.: 17/528,043

(22) Filed: Nov. 16, 2021

(65) Prior Publication Data

US 2022/0078180 A1 Mar. 10, 2022

Related U.S. Application Data

(63) Continuation-in-part of application No. 16/799,322, filed on Feb. 24, 2020, now Pat. No. 11,178,548.

(60) Provisional application No. 63/168,551, filed on Mar. 31, 2021, provisional application No. 63/164,747, (Continued)

(51) Int. Cl.
*H04L 9/40* (2022.01)
*H04W 48/10* (2009.01)

(52) U.S. Cl.
CPC ...... *H04L 63/0815* (2013.01); *H04L 63/0869* (2013.01); *H04L 63/0876* (2013.01); *H04W 48/10* (2013.01)

(58) Field of Classification Search
CPC .. H04L 63/0876; H04L 63/0869; H04L 48/10
See application file for complete search history.

(56) References Cited

U.S. PATENT DOCUMENTS 10,992,657 B1 * 4/2021 Stevens ................. H04L 63/102
11,803,621 B1 * 10/2023 Strong .................. G06F 16/903
(Continued)

FOREIGN PATENT DOCUMENTS

CN 109154889 A * 1/2019 ............... G06F 8/63
CN 109156066 A * 1/2019 ............. G06F 21/33
(Continued)

OTHER PUBLICATIONS

Extended European Search Report, European application No. 20759526.5. Date of mailing: Oct. 24, 2022. European Patent Office, Munich, DE.

*Primary Examiner* — Chau Le
(74) *Attorney, Agent, or Firm* — Gregory Finch; Finch Paolino, LLC

(57) ABSTRACT

A multi-customer electronic access control (EAC) system comprising a mobile electronic device communicably engaged with at least one EAC server via a first communications protocol and communicably engaged with at least one EAC controller and lock via a second communications protocol. In accordance with certain aspects of the present disclosure, the mobile electronic device comprises an end user application comprising an application data store configured to store a plurality of embedded and encrypted authorization data for two or more separate EAC systems. In accordance with certain aspects of the present disclosure, the end user application is configured to enable a consistent user experience and single sign-on functionality for the two or more separate EAC systems.

20 Claims, 15 Drawing Sheets

Related U.S. Application Data filed on Mar. 23, 2021, provisional application No. 62/809,085, filed on Feb. 22, 2019.

(56) References Cited

U.S. PATENT DOCUMENTS

| | | | | |
|---|---|---|---|---|
| 2009/0037287 A1* | 2/2009 | Baitalmal | ............ | G06F 21/128 705/27.1 |
| 2014/0342667 A1* | 11/2014 | Aarnio | ................ | H04W 12/065 455/41.2 |
| 2020/0257179 A1* | 8/2020 | Barnum | ............. | H04L 63/0876 |

FOREIGN PATENT DOCUMENTS

| | | | |
|---|---|---|---|
| WO | 2016089837 | A1 | 6/2016 |
| WO | 2016205402 | A1 | 12/2016 |
| WO | 2018075605 | A1 | 4/2018 |

\* cited by examiner

MULTI-CUSTOMER ELECTRONIC ACCESS CONTROL SYSTEM AND METHOD

CROSS-REFERENCE TO RELATED APPLICATIONS

This application is a continuation-in-part of U.S. patent application Ser. No. 16/799,322, filed on Feb. 24, 2020 and entitled "MULTIVENDOR SECURED ELECTRONIC ACCESS CONTROL PROCESSING," which claims the benefit of U.S. Provisional Application Ser. No. 62/809,085, filed on Feb. 22, 2019 entitled "MULTIVENDOR SECURED ELECTRONIC ACCESS CONTROL PROCESSING," the disclosures of which are hereby incorporated in their entireties at least by reference; and this application further claims the benefit of U.S. Provisional Application Ser. No. 63/164,747, filed on Mar. 23, 2021 entitled "MULTI-CUSTOMER ELECTRONIC ACCESS CONTROL SYSTEM AND METHOD," the disclosure of which is hereby incorporated in its entirety at least by reference; and this application further claims the benefit of U.S. Provisional Application Ser. No. 63/168,551, filed on Mar. 31, 2021 entitled "MULTI-CUSTOMER ELECTRONIC ACCESS CONTROL SYSTEM AND METHOD," the disclosure of which is hereby incorporated in its entirety at least by reference.

FIELD

The present disclosure relates to the field of electronic access control systems; more particularly, systems, methods and devices for secure integration of multiple vendor software applications for use across multiple vendor-specific electronic access control devices.

BACKGROUND

In the electronic access control (EAC) industry, there are a plethora of connected locking security devices that enable distributed control and administration of such devices through established communications interfaces with one or more control devices. The establishment of a communications interface and the associated data processing requires the broadcasting of device identifications. These security devices use wireless or wired communication channels to broadcast their identifications. Examples of communication network technology and standard protocols generally include the use of Bluetooth, Bluetooth Low Energy (BLE), Wi-Fi, LORA, cellular, and Ethernet, among others. For competitive reasons, manufacturers often seek to keep proprietary their methods for establishing connectivity and interfacing with their respective products. This creates a practical problem for users of multiple systems, such as service technicians, in that each owner and/or tenant system requires different credentials to access. In many cases, such credentials are controlled through disparate device-based applications (e.g., smartphone and tablet). Accordingly, a single user may need to download, configure and use multiple disparate software applications for each owner or tenant system at one or more secured sites.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present certain exemplified embodiments of the invention in a simplified form as a prelude to the more detailed description that follows.

Certain aspects of the present disclosure provide for a system comprising at least one remote server; at least one electronic access control device; and a mobile electronic device communicably engaged with the at least one remote server and the at least one electronic access control device, the mobile electronic device comprising at least one computer processor configured to execute computer program instructions; and a non-transitory computer-readable memory device communicably engaged with the at least one computer processor and having computer program instructions stored thereon that, when executed, cause the at least one computer processor to perform operations comprising: receive a plurality of authorization data for the at least one electronic access control device from the at least one remote server; store the plurality of authorization data for the at least one electronic access control device in the non-transitory computer-readable memory device; receive a device advertisement from at least one electronic access control device, wherein the at least one electronic access control device is located at a specified secure location; process the device advertisement to identify authorization data for the at least one electronic access control device from the plurality of authorization data; and communicate an authorized access command to the at least one electronic access control device in response to successfully identifying the authorization data for the at least one electronic access control device from the plurality of authorization data.

In accordance with certain aspects of the present disclosure, the plurality of authorization data for the at least one electronic access control device comprises authorized user identification data. In accordance with certain aspects of the present disclosure, the plurality of authorization data for the at least one electronic access control device comprises authorized server access data. In accordance with certain aspects of the present disclosure, the operations of the at least one computer processor may further comprise receiving, via the at least one remote server, user authorization data for the at least one electronic access control device from an owner user or a tenant user associated with the specified secure location. The operations of the at least one computer processor may further comprise receiving a second device advertisement from a second electronic access control device. The operations of the at least one computer processor may further comprise processing the second device advertisement from the second electronic access control device to identify a second set of authorization data for the second electronic access control device from the plurality of authorization data. In accordance with certain aspects of the present disclosure, the device advertisement comprises device identification data for the at least one electronic access control device. In accordance with certain aspects of the present disclosure, the plurality of authorization data for the at least one electronic access control device is embedded in a data store residing on the non-transitory computer-readable memory device of the mobile electronic device. In accordance with certain aspects of the present disclosure, the plurality of authorization data for the at least one electronic access control device is encrypted.

Further aspects of the present disclosure provide for a method comprising providing, to a mobile electronic device via at least one server, a mobile application comprising a graphical user interface configured to receive one or more user-generated inputs for configuring an access command to at least one electronic access control device in a plurality of electronic access control devices and a data store configured to store a plurality of authorization data for the plurality of electronic access control devices; configuring, with the at least one server, the plurality of authorization data for the plurality of electronic access control devices, wherein the plurality of authorization data comprises user authorization data and device authorization data; receiving, with the mobile electronic device via the mobile application, a device advertisement from a first electronic access control device, wherein the device advertisement comprises device identification data for the first electronic access control device; processing, with the mobile electronic device via the mobile application, the device advertisement to determine a first set of authorization data from the plurality of authorization data, wherein the first set of authorization data is associated with the first electronic access control device; commanding, with the mobile electronic device via the mobile application, a first transaction for the first electronic access control device, wherein the first transaction comprises the first set of authorization data.

In accordance with certain aspects of the present disclosure, the method may further comprise receiving, with the mobile electronic device via the mobile application, a second device advertisement from a second electronic access control device, wherein the second device advertisement comprises device identification data for the second electronic access control device. In accordance with certain aspects of the present disclosure, the method may further comprise processing, with the mobile electronic device via the mobile application, the second device advertisement to determine a second set of authorization data from the plurality of authorization data, wherein the second set of authorization data is associated with the second electronic access control device. In accordance with certain aspects of the present disclosure, the method may further comprise commanding, with the mobile electronic device via the mobile application, a second transaction for the second electronic access control device, wherein the second transaction comprises the second set of authorization data. In certain embodiments, the device advertisement from the first electronic access control device comprises a Bluetooth Low Energy broadcast message. In accordance with certain aspects of the present disclosure, the method may further comprise receiving, with the mobile electronic device via the mobile application, a user-generated input comprising user authorization data for one or more user roles. In certain embodiments, the plurality of authorization data further comprises server access data. In certain embodiments, processing the device advertisement further comprises executing, with the mobile application, at least one operation for establishing a data transfer interface between the mobile application and an authorized server. In certain embodiments, the one or more user roles comprise an owner user role and a non-owner user role. In certain embodiments, the first electronic access control device is associated with a first electronic access control system and the second electronic access control device is associated with a second electronic access control system, wherein the first electronic access control system is different from the second electronic access control system.

Still further aspects of the present disclosure provide for a non-transitory computer-readable medium storing executable computer program instructions, the instructions executable to command at least one processor to perform operations comprising providing a mobile application comprising a graphical user interface configured to receive one or more user-generated inputs for configuring an access command to at least one electronic access control device in a plurality of electronic access control devices and a data store configured to store a plurality of authorization data for the plurality of electronic access control devices; configuring the plurality of authorization data for the plurality of electronic access control devices, wherein the plurality of authorization data comprises user authorization data and device authorization data; receiving a device advertisement from a first electronic access control device, wherein the device advertisement comprises device identification data for the first electronic access control device; processing the device advertisement to determine a first set of authorization data from the plurality of authorization data, wherein the first set of authorization data is associated with the first electronic access control device; and commanding a first transaction for the first electronic access control device, wherein the first transaction comprises the first set of authorization data.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
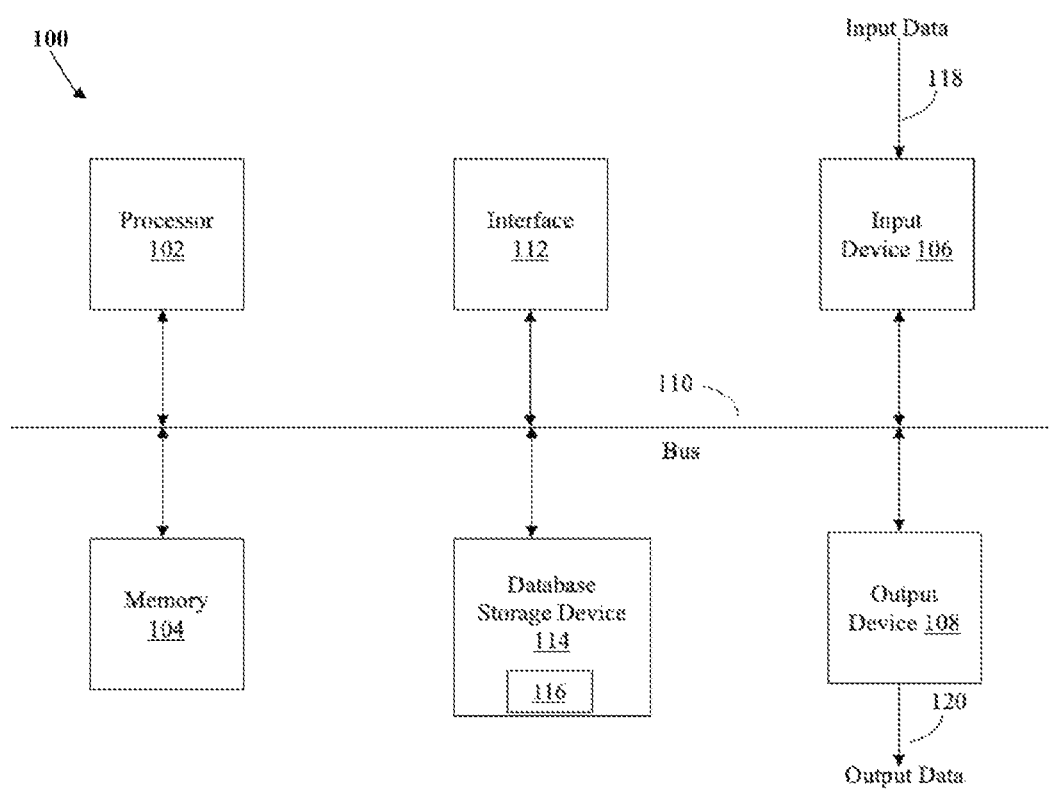
FIG. 1 is a block diagram of a computing device through which one or more aspects of the present disclosure may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems configured to provide for an administration and support application and platform for users of disparate wireless electronic locking devices from multiple vendors. Certain embodiments of the present disclosure may incorporate a predefined routing method to enable support of a variety of devices and products from different manufacturers. An exemplary application and platform may be operable to process a predefined data structure for interfacing of devices without the need for exposing proprietary information. The exemplary application and platform may contain multiple levels of a secured method for defining multivendor applications and connected devices. An application programming interface and/or other data transfer protocol(s) may enable a user to integrate one or more vendor-specific software systems for the management of multiple security locking devices using a single platform.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "vendor" refers to a manufacturer, developer, supplier, or other source identifier associated with an electronic access control device and/or a software application configured to communicate and/or control an electronic access control device. As used herein, the term "multivendor" refers to two or more distinct, independent, or otherwise separate or disparate vendors. The terms "vendor" and "manufacturer" are intended to be used interchangeably, as used herein.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "interface" refers to any shared boundary across which two or more separate components of a computer system may exchange information. The exchange can be between software, computer hardware, peripheral devices, humans, and combinations thereof.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one Bluetooth advertisement channel.

As used herein, the term "native" refers to any software program that is installed on a mobile electronic device.

As used herein, the term "peripheral device" refers to any internal or external device that connects directly to a computer but does not contribute to the computer's primary function. In certain embodiments, a peripheral device may include any electronic access control device configured to receive one or more commands from a controller. In certain embodiments, a peripheral device may include any electronic access control device configured to establish a communications interface with a mobile electronic device. In certain embodiments, a peripheral device may include any device configured to connect to a central device over a wireless communications interface, such as Bluetooth. In certain embodiments, a peripheral device may include an electronic device configured to transmit an advertisement. In certain device interactions, the same device may constitute a peripheral device in some instances and a central device in other instances.

As used herein, the term "central device" refers to any electronic device configured to establish a communications interface with a peripheral device. In certain embodiments, a central device may include an electronic device configured to receive an advertisement from a peripheral device.

An exemplary system, method, and apparatus according to the principles herein includes a platform product (optionally including using an end user application) that provides for integrated management of multiple vendor software applications for use with multiple vendor-specific electronic access control devices.

An exemplary system, method, and apparatus according to the principles herein may include one or more connected device from different manufacturers at a site, a smartphone, server software, and/or a host server software. A smartphone may comprise a host application configured to process advertisement(s) from peripheral device(s), process manufacturer-product information (MPI) from the advertisement(s), and route the MPI data between two or more software programs configured to establish a communication/control interface between the smartphone and the peripheral device(s). In various embodiments, a host server software can interface with at least one manufacturer server software that can optionally interface with other system components, including but not limited to, one or more content application of smartphone and one or more connected device.

An exemplary system, method, and apparatus according to the principles herein may include a user that may activate a host smartphone application configured to receive and process advertisements from one or more peripheral devices. The host smartphone application may process the advertisement to extract MPI data, route the MPI data to an associated manufacturer software application/module, and enable connectivity and interaction with the peripheral device and optionally one or more remote server.

In various embodiments, a manufacturer software application may optionally interface with a manufacturer application server. In various embodiments, a manufacturer application server may optionally interface a host server to send and receive data for authorization, access information, audit trail and other data processing such as alarm management to host smartphone application. In various embodiments, the host smartphone application may optionally interface with the host server and manufacturer application server for authorization, access information, audit trail and other data processing such as alarm management.

In various embodiments, MPI data may include one or more dedicated bytes, preferably 6 or more bytes, to define or identify a specific manufacturer and product model. In a preferred embodiment, the MPI data comprises one or more security levels to create and process a device identification (ID). In one embodiment, a low security level is created that is interpretable by at least one manufacturer. In another embodiment, a moderate security level is created using one or more encryption algorithms to protect the data. In yet another embodiment, a high security level is created using the highest bit encryption algorithms optionally authenticated by an independent third party. In an alternative embodiment, the MPI data contains one or more applicable security method and values. The MPI data may further include identifying information including, but not limited to, manufacturer name, ID and product ID (optional), application ID, application name, download location, server locations, interface documentation location (optional), operating system requirements, graphics options, miscellaneous data, data required to utilize an application, or combinations thereof.

In various embodiments, an exemplary system, method, and apparatus according to the principles herein may process MPI data to perform one or more operations including, provisioning, advertising, and/or processing. In various embodiments, provisioning enables a manufacturer or user to specify the identifier to be advertised. For example, with BLE, this is the BLE serial number. In various embodiments, advertising enables the product to broadcast its ID to other systems. For example, for BLE, the BLE serial number is broadcasted to smartphones and an application is running either in the background or foreground, which will receive the ID and decode the ID for processing. In various embodiments, during processing an ID is used to route the data and user processing to the correct part of code, module or application in an off-line and/or online processing mode(s). These steps enable a user to interface with a single application configured to guide the user to the correct part of the application or applications to interface with a corresponding software program that can execute steps to interface with a peripheral electronic access control device. In an embodiment, a QR code is used for MPI data storage and communication purposes.

In accordance with an exemplary use case provided by embodiments of the present disclosure, an end user of a host smartphone application (for example, a service technician who needs to gain access to an area that is secured by an electronic access control system) launches an instance of the host smartphone application and receives and processes an advertisement from the electronic access control device (for example, an electronically-actuated mechanical lock). The host smartphone application processes an advertising packet and references MPI data contained therein. The host smartphone application then routes the MPI data to an associated manufacturer smartphone software and/or data, which is operable to enable connectivity and interaction with the electronic access control device, and optionally a manufacturer server. The manufacturer smartphone software and/or data then optionally interfaces with the manufacturer server, which optionally interfaces with a host server to send and receive data for authorization, access information, audit trail and other data processing, such as alarm management, for the electronic access control device. The host smartphone application may also optionally interface with the host server and manufacturer server for authorization, access information, audit trail and other data processing such as alarm management. The end user (e.g. service technician) is thereby able to utilize the host smartphone application to quickly identify and initiate the correct software to operably interface with the electronic access control device.

Certain benefits and advantages of the present disclosure include a simple-to-use mobile software application including an integrated user interface that enables administration and control of electronic access control devices across multiple manufacturers/products through the use of a predefined routing and integration methodology. The predefined routing/integration methodology provides for secure sharing of agreed-upon data between disparate EAC software applications without exposing proprietary information therebetween. Certain objects and advantages of the present disclosure include a secured data processing methodology for defining multivendor applications and connected products and flexibly integrating disparate software systems using application interfaces and user interfaces.

An aspect of the present disclosure is a multi-customer electronic access control system configured to enable a user to download a single mobile application to the user's mobile electronic device configured to provide a consistent user experience and single sign-on functionality for multiple, disparate EAC systems.

Certain benefits and advantages of the present disclosure include enhanced user experience and time savings for wireless interface protocols between client devices and EAC devices across multiple disparate EAC systems.

In various embodiments, an exemplary system, method, and apparatus according to the principles herein may grant an owner or tenant user within a site the ability to share limited access to an EAC lock with non-owner users (e.g., services technicians) and grant expanded access to the EAC lock with user owners within a single software application. In certain embodiments, the single software application is a native mobile application installed on a mobile electronic device (i.e., client device).

An aspect of the present disclosure is a multi-customer electronic access control system configured to securely share server and authorization information that is encrypted and embedded with the software application. In accordance with further aspects of the present disclosure, the authorization information may only be utilized if the user is either at a secured site and detects an identifiable EAC system or is offsite and enters/inputs authorization information, such as a username/password, PIN or certifications. The data that is encrypted and stored must be able to translate the system site ID and/or user ID in order to identify the correct account and server interface location, such as an Internet URL or IP address. Once an EAC system is identified, then all transactions related to that system are securely enclosed within that single system until such time as a new system is discovered and authorized.

In accordance with an exemplary use case provided by embodiments of the present disclosure, a multi-customer electronic access control system may comprise an EAC gate lock that is shared with multiple owners and tenants to a site compound. Once the user discovers the EAC gate lock (e.g., via BLE advertisement at user's mobile electronic device), the user can, with or without identity information, unlock the EAC gate lock so that the user can enter the site compound. Once the user is within the site compound, the user may discover that a subject enclosure (e.g., a cabinet) may be secured by a different type of EAC lock with a different server location. In accordance with certain aspects of the present disclosure, the user's mobile application will discover the different type of EAC lock, authorize the user to access the lock and perform the access all within the same instance and user interface of the mobile application.

In various embodiments, an exemplary system, method, and apparatus according to the principles herein may utilize a variety of different approaches to configure the multi-customer electronic access control application to the correct EAC system mode for each EAC device. In accordance with certain aspects of the present disclosure, such approaches may include: (1) translating an embedded EAC system ID from the EAC system, such as the BLE broadcast message or WIFI SSID that triggers the application to utilize authorization for that system and server location; (2) running deeplink commands from a browser page, text message, email, or other means that switches the mode of the application to the right EAC system; and (3) receiving a user-generated input comprising authorization information for the right EAC system.

In various embodiments, in an exemplary system, method, and apparatus according to the principles herein, the multi-customer electronic access control may comprise a data store that encrypts all identity, authorization and server access information so that each EAC system can be locally validated and interfaced with via the same instance and user interface of the multi-customer electronic access control application.

Turning now descriptively to the drawings, in which similar reference characters denote similar elements throughout the several views, FIG. 1 depicts a computing system in which certain illustrated embodiments of the present invention may be implemented.

Referring now to FIG. 1, a processor-implemented computing device in which one or more aspects of the present disclosure may be implemented is shown. According to an embodiment, a processing system 100 may generally comprise at least one processor 102, or a processing unit or plurality of processors, memory 104, at least one input device 106 and at least one output device 108, coupled together via a bus or a group of buses 110. In certain embodiments, input device 106 and output device 108 could be the same device. An interface 112 can also be provided for coupling the processing system 100 to one or more peripheral devices, for example interface 112 could be a PCI card or a PC card. At least one storage device 114 which houses at least one database 116 can also be provided. The memory 104 can be any form of memory device, for example, volatile or non-volatile memory, solid state storage devices, magnetic devices, etc. The processor 102 can comprise more than one distinct processing device, for example to handle different functions within the processing system 100. Input device 106 receives input data 118 and can comprise, for example, a keyboard, a pointer device such as a pen-like device or a mouse, audio receiving device for voice-controlled activation such as a microphone, data receiver or antenna such as a modem or a wireless data adaptor, a data acquisition card, etc. Input data 118 can come from different sources, for example keyboard instructions in conjunction with data received via a network. Output device 108 produces or generates output data 120 and can comprise, for example, a display device or monitor in which case output data 120 is visual, a printer in which case output data 120 is printed, a port, such as for example a USB port, a peripheral component adaptor, a data transmitter or antenna such as a modem or wireless network adaptor, etc. Output data 120 can be distinct and/or derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. In general, the processor 102 can receive instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 can be communicated to other devices via the network. The transfer of information and/or data over the network can be achieved using wired communications means or wireless communications means. A server can facilitate the transfer of data between the network and one or more databases. A server and one or more database(s) provide an example of a suitable information source.

Thus, the processing computing system environment 100 illustrated in FIG. 1 may operate in a networked environment using logical connections to one or more remote computers. In embodiments, the remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the invention may be implemented. That is, FIG. 1 is but an example of a suitable environment and is not intended to suggest any limitations as to the structure, scope of use, or functionality of embodiments of the present invention exemplified therein. A particular environment should not be interpreted as having any dependency or requirement relating to any one or a specific combination of components illustrated in an exemplified operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms data or maintains it at locations in the memory system of the computer, which reconfigures or otherwise alters the operation of the computer in a manner that is conventionally understood by those skilled in the art. The data structures in which data is maintained are physical locations of the memory that have particular properties defined by the format of the data. However, while certain embodiments may be described in the foregoing context, the scope of the disclosure is not meant to be limiting thereto, as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with embodiments of the invention include, but are not limited to, personal computers, handheld or laptop devices, personal digital assistants, multiprocessor systems, microprocessor-based systems, set top boxes, programmable consumer electronics, networks, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, description will now turn towards illustrated embodiments of the present invention which generally relate to systems and methods for data processing to establish secure connections between a mobile electronic device and an electronic access control device across multiple vendors. It is to be understood and appreciated that certain aspects of the methods described herein comprise receiving, with a mobile electronic device, a data input comprising device identification data for an electronic access control device; processing, with at least one processor, the data input to determine the device identification data for the electronic access control device; selecting, with the at least one processor, an electronic access control program from two or more electronic access control programs, wherein the two or more electronic access control programs are associated with two or more vendors; routing, with the at least one processor, the device identification data to the electronic access control program; and initiating, with the at least one processor, an instance of the electronic access control program on the mobile electronic device, wherein the instance of the electronic access control program is configured to process the device identification data and establish a data transfer interface between the mobile electronic device and the electronic access control device.

Figure 2:
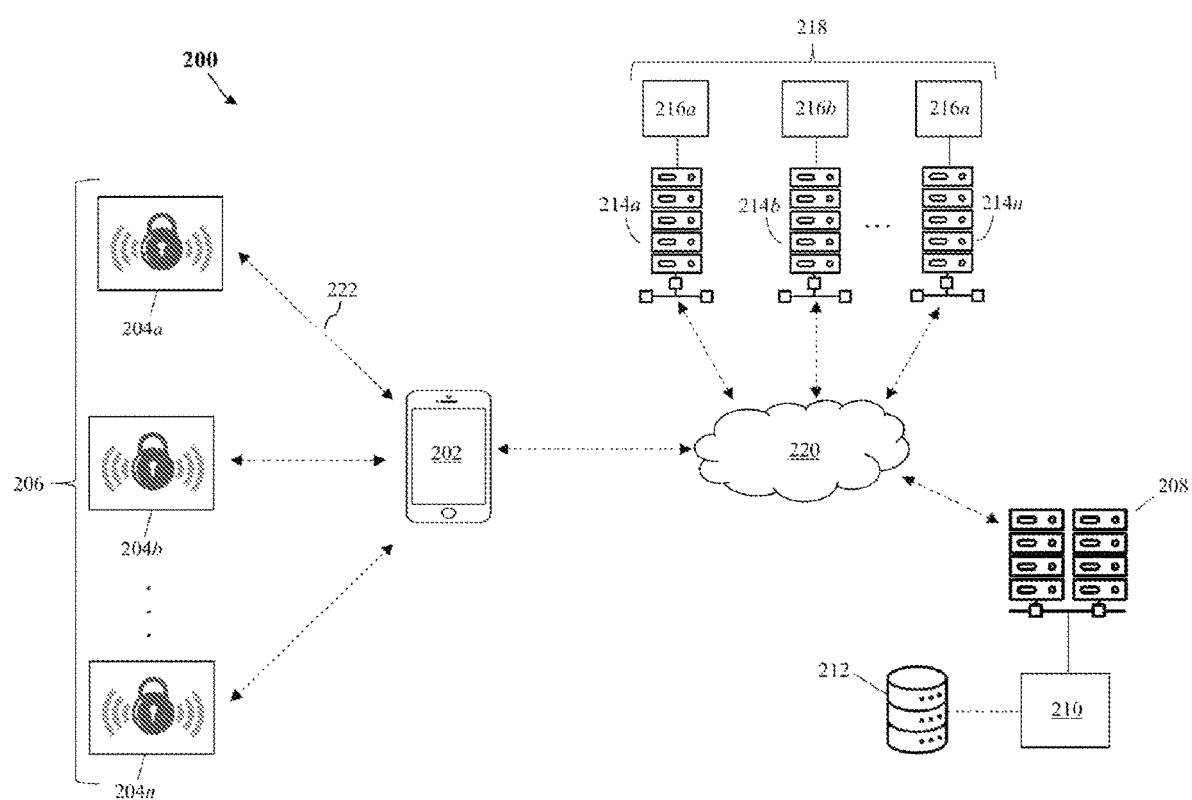
FIG. 2 is an architecture diagram of a multivendor electronic access control (EAC) system, in accordance with certain aspects of the present disclosure.

Referring now to FIG. 2, an architecture diagram of a multivendor electronic access control (EAC) system 200 is shown. In accordance with an embodiment, system 200 may be comprised of a mobile electronic device 202 and two or more electronic access control devices 206 defining a multivendor device environment. The two or more electronic access control devices 206 may be comprised of electronic access control devices from a variety of different device vendors (i.e. multivendor device environment). For example, two or more electronic access control devices 206 may be comprised of electronic access control devices 204*a*, 204*b* and 204*n*. Each of electronic access control devices 204*a*, 204*b* and 204*n* may comprise distinct product models and/or device manufacturers, and may be operably installed at separate locations in a single electronic access controlled environment, separate locations across multiple related access controlled environments (i.e., environments being under common control or ownership), and/or one or more separate locations across multiple unrelated access controlled environments (i.e., different customers/owners). In accordance with certain embodiments, each of electronic access control devices 204*a*, 204*b* and 204*n* may be controlled by a control device, such as mobile electronic device 202. In certain embodiments, mobile electronic device 202 is a smartphone or tablet computer. Electronic access control devices 204*a*, 204*b* and 204*n* may be communicably engaged with mobile electronic device 202 via a wireless or wireline communications interface 222 to send and receive data between mobile electronic device 202 and each of electronic access control devices 204*a*, 204*b* and 204*n*. In certain embodiments, communications interface 222 is a wireless communications interface comprising a Bluetooth protocol. In accordance with such embodiments, electronic access control devices 204*a*, 204*b* and 204*n* are peripheral devices and mobile electronic device 202 is a central device. Upon establishing a connection with one or more of electronic access control devices 204*a*, 204*b* and 204*n*, mobile electronic device 202 may serve as a communications hub (i.e. master) for one or more of electronic access control devices 204*a*, 204*b* and 204*n* (i.e. slave) in a master-slave architecture.

In accordance with certain embodiments, electronic access control devices 204*a*, 204*b* and 204*n* may broadcast advertising packets to establish a connection with mobile electronic device 202. Mobile electronic device 202 may be configured to receive advertising packets and process an advertisement payload to establish a connection with an access control device. In certain embodiments, the advertisement payload may comprise a proprietary advertisement address and data structure associated with a specific product ID and manufacturer ID (i.e., MPI data) for each of electronic access control devices 204*a*, 204*b* and 204*n*. Mobile electronic device 202 may comprise a host application configured to process the advertisement payload and route the MPI data to a manufacturer software application/module configured to authorize and enable connection and data transfer between mobile electronic device 202 and the electronic access control device (as described in more detail below with reference to FIG. 3).

In accordance with certain embodiments, system 200 may further include a host application server 208 comprising a host server software 210 and a host database 212; and one or more manufacturer application servers 218 comprising manufacturer servers 214*a*, 214*b*, and 214*n*. Manufacturer servers 214*a*, 214*b*, and 214*n* may include manufacturer software 216*a*, 216*b*, and 216*n*. In accordance with certain embodiments, mobile electronic device 202 may be communicably engaged to send and receive (either directly or indirectly) access control data between host application server 208 and/or manufacturer application servers 218 via communications network 220. Communications network 220 may be an Internet connection and/or a broadband cellular network. In certain embodiments, host application server 208 may serve as a communication hub between mobile electronic device 202 and manufacturer application servers 218.

Figure 3:
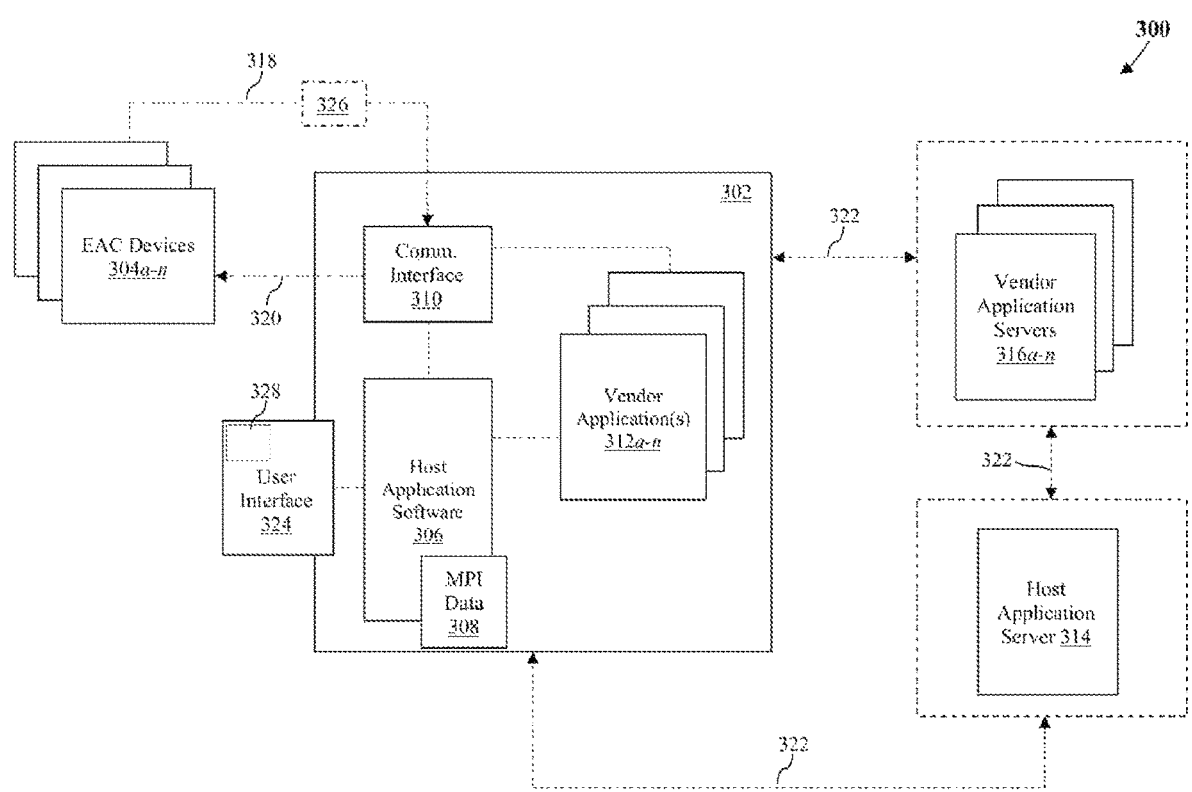
FIG. 3 is a functional block diagram of a multivendor EAC system, in accordance with certain aspects of the present disclosure.

Referring now to FIG. 3, a functional block diagram of a multivendor EAC system 300 is shown. In accordance with an embodiment, system 300 is comprised of mobile electronic device 302, EAC devices 304*a-n*, vendor application servers 316*a-n*, and host application servers 314. System 300 may be operably configured to establish a secure device connection between smartphone 302 and EAC devices 304*a-n*. In accordance with an embodiment, EAC devices 304*a-n* broadcast an advertisement 318 comprising an advertising packet 326. Advertising packet 326 may comprise a payload including MPI data 308. MPI data 308 may include identifying information for a product and/or manufacturer and may be configured as a proprietary data structure/type for each vendor. Mobile electronic device 302 may receive advertisement 318 via communications interface 310. Communications interface 310 may communicate advertisement 326 to host application 306, which may process advertisement 318 to determine MPI data 308. Mobile electronic device 302 may include a user interface 324 configured to render a graphical user interface (GUI) 328 for host application 306. Host application 306 may analyze MPI data 308 to identify the product and/or manufacturer associated with the MPI data 308 and select the vendor application from vendor applications 312*a-n* that is operably configured to enable connectivity and interaction with the associated EAC device 304*a-n*. Host application 306 may be operably configured to initiate an instance of the vendor application 312*a-n* and route MPI data 308 to vendor application 312*a-n*. Vendor application 312*a-n* may be native to mobile electronic device 302. The instance of vendor application 312*a-n* may run in the background to host application 306, such that host application 306 is configured to present data received from the instance of vendor application 312*a-n* to GUI 328. In certain embodiments, host application 306 may be configured render a GUI associated with the instance of vendor application 312*a-n* at the user interface 324. Vendor application 312*a-n* may be configured to execute one or more operations to enable connectivity and interaction between mobile electronic device 302 and EAC device 304*a-n*, including operations to send and/or receive data for authorization, information/data exchange, audit trail recording/reporting and other data processing functions, including but not limited to, alarm management. In certain embodiments, vendor application 312*a-n* may be communicatively coupled to vendor application servers 316*a-n* via network interface 322. Vendor application servers 316*a-n* may be configured to execute a server-side instance of vendor application 312*a-n*. The server-side instance of vendor application 312*a-n* may be configured to execute one or more operations to send/receive data to/from vendor application 312*a-n* for authorization, information/data exchange, audit trail recording/reporting and other data processing functions, including but not limited to, alarm management for EAC device(s) 304*a-n*. In certain embodiments, vendor application servers 316a-n may be communicatively coupled to host application server 314 via network interface 322. Vendor application servers 316a-n may be configured to execute one or more operations to send/receive data to/from host application server 314 for authorization, information/data exchange, audit trail recording/reporting and other data processing functions, including but not limited to, alarm management for EAC device(s) 304a-n. Host application server 314 may be communicatively coupled to host application 306 via network interface 322 to send/receive data for authorization, information/data exchange, audit trail recording/reporting and other data processing functions, including but not limited to, alarm management for EAC device(s) 304a-n. In certain embodiments, host application 306 may be communicatively coupled with host application server 314 and vendor application server(s) 316a-n via network interface 322 to send/receive data for authorization, information/data exchange, audit trail recording/reporting and other data processing functions, including but not limited to, alarm management for EAC device(s) 304a-n.

Figure 4:
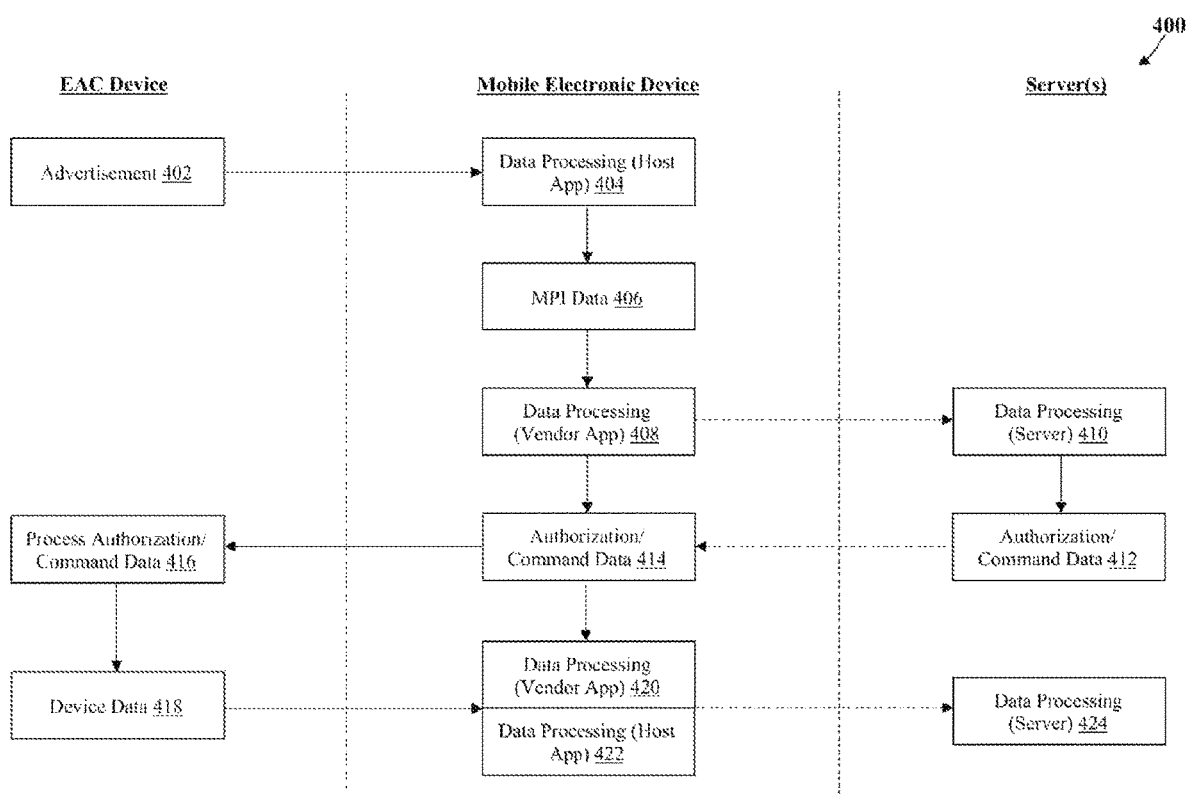
FIG. 4 is a data flow diagram of a multivendor EAC system, in accordance with certain aspects of the present disclosure.

Referring now to FIG. 4, a data flow diagram 400 of a multivendor EAC system (for example, system 200 of FIG. 2 and/or system 300 of FIG. 3) is shown. In accordance with an embodiment, an advertisement 402 comprising an advertising packet is broadcast from EAC device and is received by mobile electronic device. The advertisement 402 is processed by host application 404 to determine MPI data 406. MPI data 406 is routed by host application to vendor application for processing 408. In accordance with certain embodiments, the vendor application sends the MPI data to a server for processing 408. The server(s) may include a vendor application server(s) and/or a host application server. The vendor application may process the MPI data 414 to determine authorization/command data for the EAC device. In certain embodiments, the server(s) may process the MPI data 412 to determine authorization/command data for the EAC device and send the data to the vendor application. The vendor application may command the mobile electronic device to send the authorization/command data to the EAC device, and the EAC device may process the authorization/command data 416 to execute one or more operations. The EAC device may store one or more device activity inputs in response to executing the one or more operations comprising device data 418. Device data 418 may be communicated from EAC device to the mobile electronic device. Device data 418 may be received and processed by the vendor application 420 and/or the host application 422. The authorization/command data 414 may be stored by the vendor application 420 and/or the host application 422. The vendor application 420 and/or the host application 422 may communicate the device data to the vendor application server(s) and/or the host application server for additional data processing and/or data storage 424.

Figure 5:
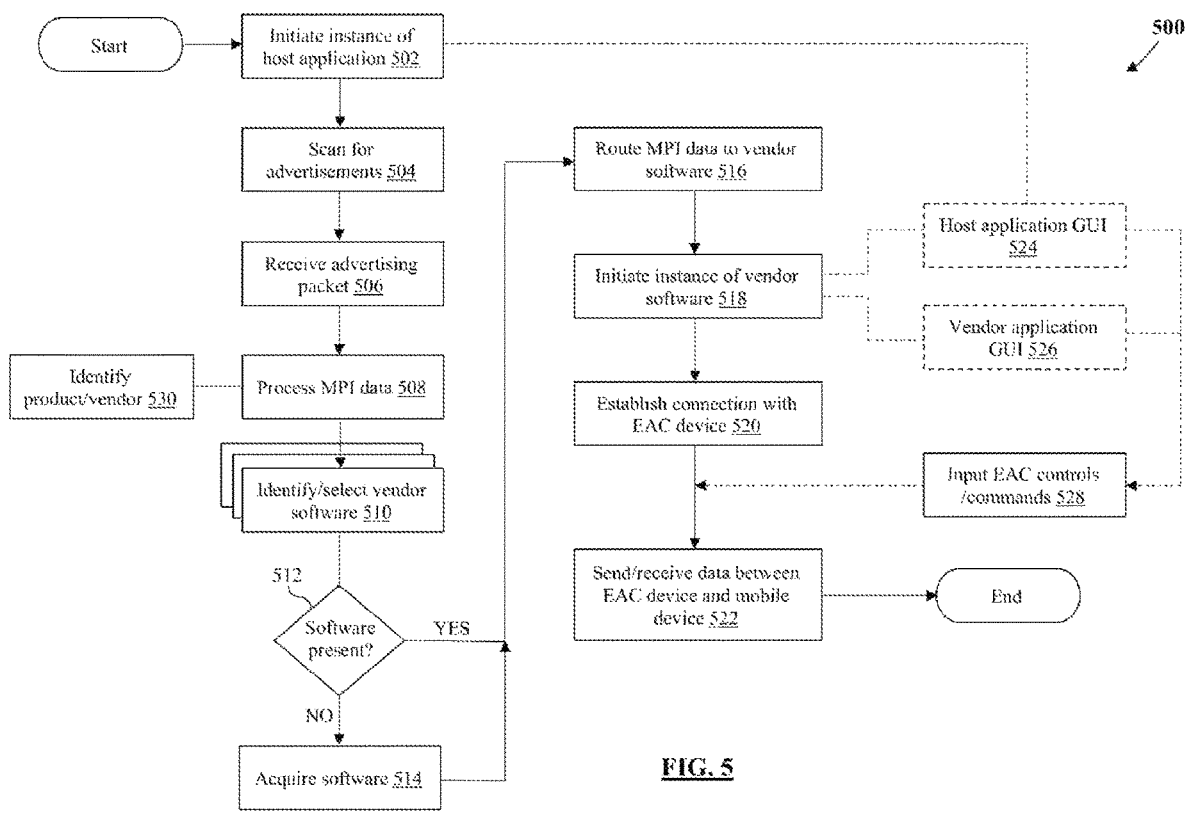
FIG. 5 is a process flow diagram of a routine for data routing and device connection in a multivendor EAC system, in accordance with certain aspects of the present disclosure.

Referring now to FIG. 5, a process flow diagram of a routine 500 for data routing and device connection in a multivendor EAC system is shown. In accordance with certain embodiments, multivendor EAC system may be that of system 200 of FIG. 2 and/or system 300 of FIG. 3. In an embodiment, routine 500 is embodied in one or more operations of a host software application executing on a mobile electronic device. Routine 500 is commenced by initiating an instance of the host software application 502 and executing a scanning operation to scan for device advertisements 504 being broadcast/communicated from one or more EAC devices. Routine 500 continues by receiving an advertising packet 506 and processing MPI data 508 from the advertising packet. Processing MPI data 508 from the advertising packet may include identifying a product/vendor associated with the MPI data 530. Routine 500 may continue by identifying and selecting vendor software associated with the product/vendor 510. Routine 500 may continue by executing a decision step 512 to determine whether the vendor software associated with the product/vendor is available/accessible to the host application. If NO, routine 500 continues by executing one or more steps to acquire and/or access the software 514. This may include downloading the software from a remote server over a communications interface and/or accessing a remote instance of the software via a web interface. If YES (or after the software is acquired or otherwise accessible to the host application), routine 500 may continue by routing the MPI data to the vendor software 516 and initiating an instance of the vendor software. The instance of the vendor software may run separately from the host application or as a library module within the host application. The instance of the vendor software may run as a background application to the host application or may be part of the interface of the host application. Routine 500 may render one or more interface elements within a host application GUI 524 or a vendor application GUI 526 in response to initiating the instance of the vendor software 518. The host application GUI 524 and/or the vendor application GUI 526 may be configured to receive a user input for one or more EAC controls/commands 528. Routine 500 may continue by executing one or more operations to establish a connection/interface between the mobile electronic device and the EAC device 520. Routine 500 may continue by executing one or more operations to send/receive data between the mobile electronic device and the EAC device 522.

Figure 6:
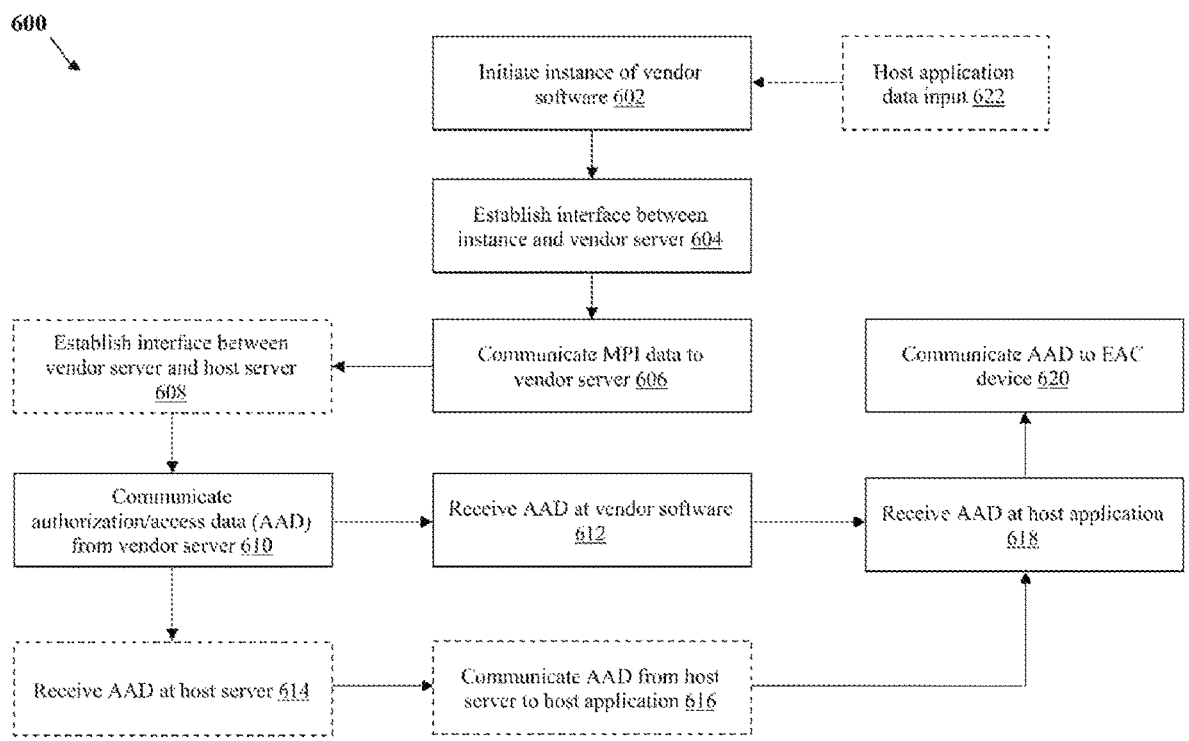
FIG. 6 is a process flow diagram of a routine for client-server connection and data transfer in a multivendor EAC system, in accordance with certain aspects of the present disclosure.

Referring now to FIG. 6, a process flow diagram of a routine 600 for establishing a client-server interface in a multivendor EAC system is shown. In accordance with certain embodiments, multivendor EAC system may be that of system 200 of FIG. 2 and/or system 300 of FIG. 3. In certain embodiments, routine 600 may be a subroutine of routine 500 and/or a continuation of routine 500. Routine 600 may commence by initiating an instance of vendor software application 602 (in response to receiving an MPI data input from host software application 622). In certain embodiments in which routine 600 is subroutine and/or a continuation of routine 500, Step 602 may comprise Step 518 of routine 500. Routine 600 may continue by establishing a communications interface between the instance of vendor software application and a vendor application server 604. Routine 600 may optionally continue by establishing a communications interface between the vendor application server and a host application server 608. Routine 600 may continue by communicating authorization/access data from the vendor application server 610. The authorization/access data may include data for EAC device authorization and access information, EAC device communication protocols, EAC device controls/commands, EAC audit trail recording/reporting and other data processing functions such as alarm management. Routine 600 may continue by receiving the authorization/access data at the vendor software application 612 and may optionally continue by further receiving the authorization/access data at the host server 614. Routine 600 may continue by communicating the authorization/access data to the host application 618 and may further continue by communicating the authorization/access data to the connected EAC device 620. In certain embodiments, routine 600 may continue from Step 610 by receiving the authorization/access data at the host server 614 and may further continue by communicating the authorization/access data from the host server to the host application 616.

Figure 7:
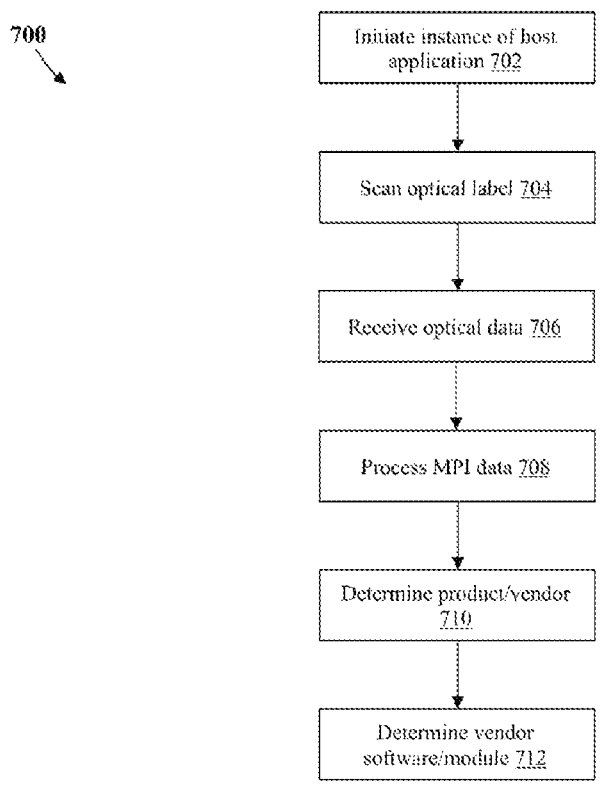
FIG. 7 is a process flow diagram of a subroutine for MPI data processing, in accordance with certain aspects of the present disclosure.

Referring now to FIG. 7, a process flow diagram of a subroutine 700 for MPI data processing is shown. In certain embodiments, routine 700 may be a subroutine of routine 500 or 600 and/or a continuation of routine 500 or 600. In accordance with an embodiment, subroutine 700 is operably configured to process MPI data from a machine-readable optical label, such as a QR code of a barcode. Subroutine 700 may commence by initiating an instance of a host application on a mobile electronic device 702. In certain embodiments in which routine 700 is subroutine and/or a continuation of routine 500, Step 702 may comprise Step 502 of routine 500. Subroutine 700 may continue by executing operations for scanning an optical label associated with an EAC device 704. Subroutine 700 may continue by receiving the optical data from the optical label 706 and processing MPI information from the optical data 708. Subroutine 700 may continue by determining the product/vendor associated with the MPI data 710 and further determining the vendor software/module associated with the product/vendor 712. In certain embodiments in which routine 700 is subroutine and/or a continuation of routine 500, Step 712 may comprise Step 510 of routine 500.

Figure 8:
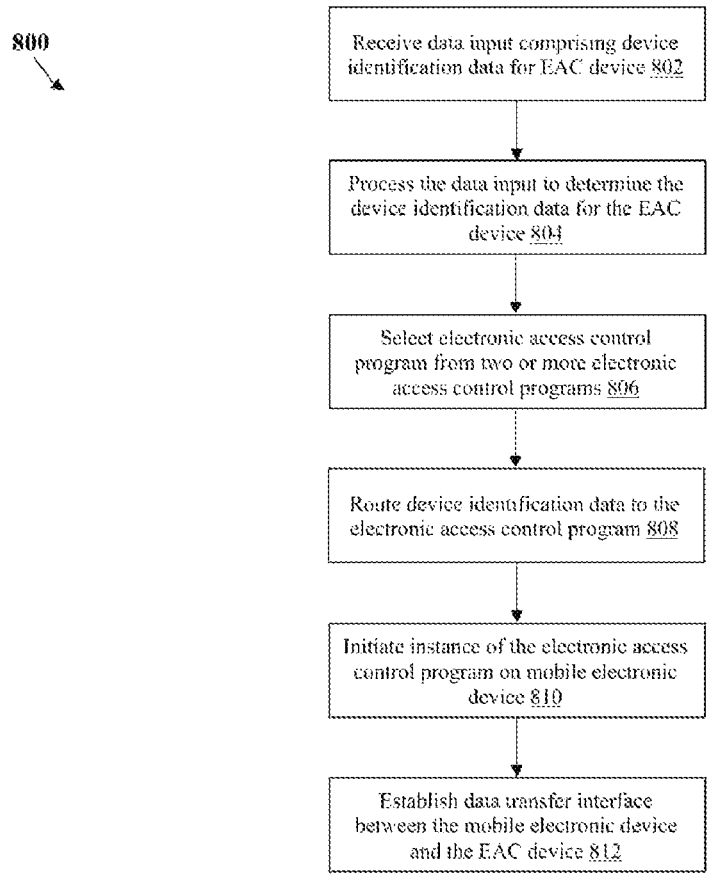
FIG. 8 is a process flow diagram of a method for multi-vendor electronic access control, in accordance with certain aspects of the present disclosure.

Referring now to FIG. 8, a process flow diagram of a method 800 for multivendor electronic access control is shown. In accordance with an embodiment, method 800 is initiated by receiving, with a mobile electronic device, a data input comprising device identification data for an electronic access control device (Step 802). In certain embodiments, the data input is a Bluetooth advertising packet. In certain embodiments, the data input is encoded in a machine-readable optical label. In certain embodiments, the device identification data comprises a manufacturer identifier and a product model identifier. Method 800 may continue by processing, with at least one processor, the data input to determine the device identification data for the electronic access control device (Step 804). Method 800 may continue by selecting, with the at least one processor, an electronic access control program from two or more electronic access control programs (Step 806). In accordance with certain embodiments, the two or more electronic access control programs are associated with two or more vendors. In certain embodiments, the two or more electronic access control programs are native to the mobile electronic device. Method 800 may continue by routing, with the at least one processor, the device identification data to the electronic access control program (Step 808). Method 800 may continue by initiating, with the at least one processor, an instance of the electronic access control program on the mobile electronic device (Step 810). Method 800 may continue by establishing a data transfer interface between the mobile electronic device and the electronic access control device (Step 812).

In accordance with certain embodiments, method 800 may further include a step for establishing, with the mobile electronic device, a communications interface with at least one remote server being configured to send and receive access control data for the electronic access control device. In accordance with certain embodiments, method 800 may further include a step for communicating, with the mobile electronic device, one or more access control commands to the electronic access control device via the data transfer interface. In accordance with certain embodiments, method 800 may further include a step for providing, with the at least one processor communicably engaged with the mobile electronic device, a graphical user interface configured to select the electronic access control program from the two or more electronic access control programs. In accordance with certain embodiments, method 800 may further include a step for providing, with the at least one processor communicably engaged with the mobile electronic device, a graphical user interface configured to receive one or more user inputs configured to command one or more operations of the electronic access control device.

Figure 9:
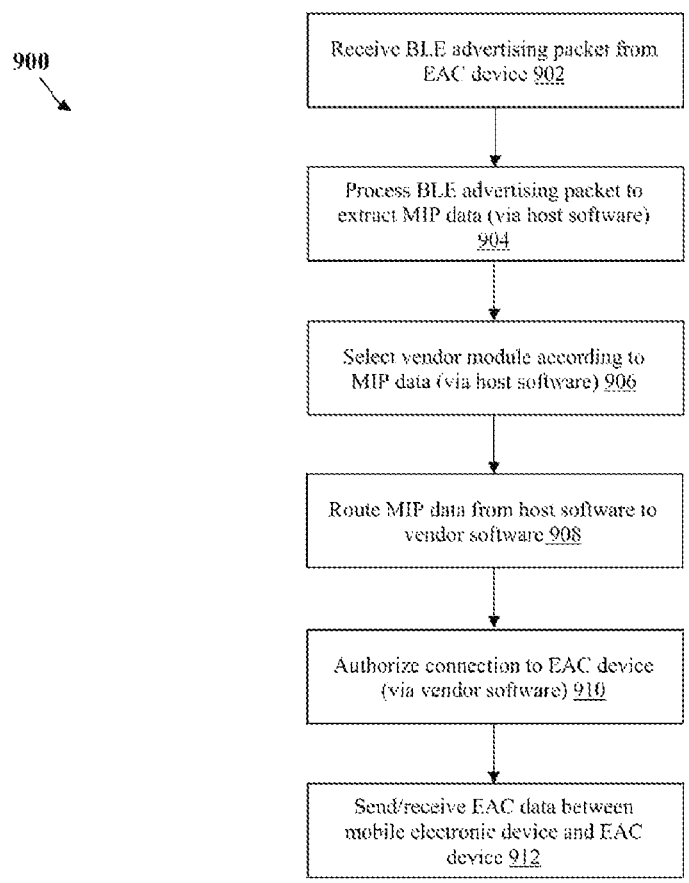
FIG. 9 is a process flow diagram of a method for multi-vendor electronic access control, in accordance with certain aspects of the present disclosure.

Referring now to FIG. 9, a process flow diagram of a method 900 for multivendor electronic access control is shown. In accordance with an embodiment, method 900 is initiated by receiving, with a mobile electronic device, a BLE advertising packet from an EAC device (Step 902). In certain embodiments, the EAC device is configured as a peripheral device and the mobile electronic device is configured as a central device. Method 900 may continue by processing, via host software executing on the mobile electronic device, the BLE advertising packet to extract MIP data (Step 904). Method 900 may continue by selecting, via the host software, a vendor module according to MIP data (Step 906). Method 900 may continue by routing the MIP data from host software to vendor software (Step 908). Method 900 may continue by authorizing, via the vendor software, a connection to between the EAC device and the mobile electronic device (Step 910). Method 900 may continue by sending/receiving, via the host software being communicably engaged with the vendor software, EAC data between the mobile electronic device and the EAC device (Step 912).

Figure 10:
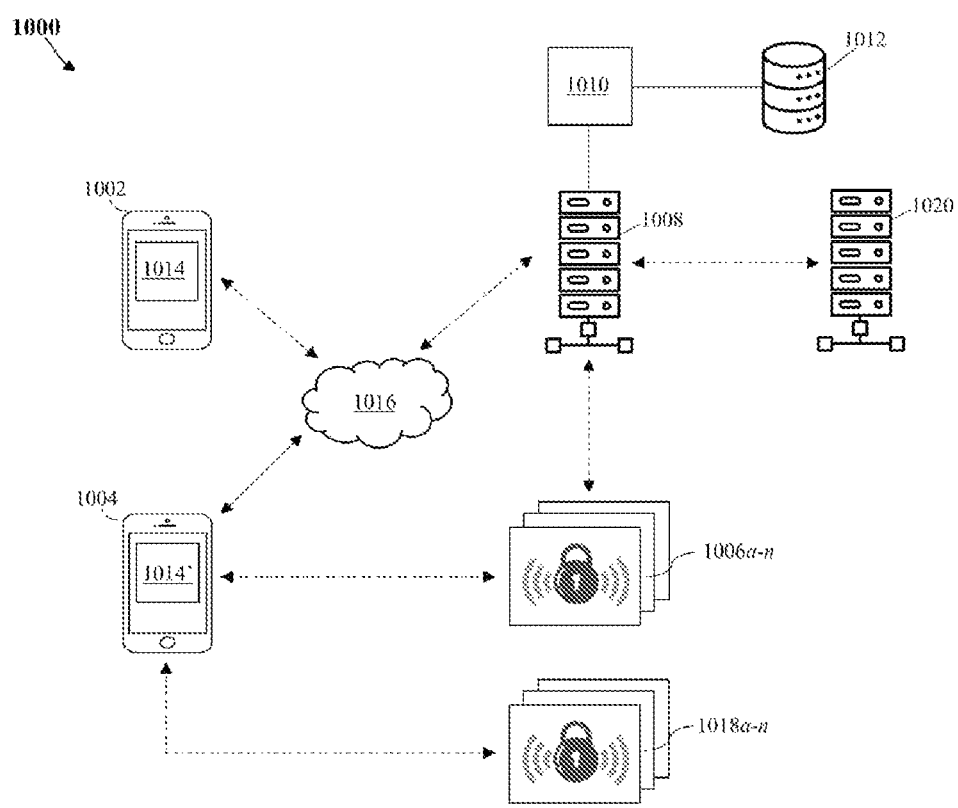
FIG. 10 is a system diagram of a multi-customer single application EAC system, in accordance with certain aspects of the present disclosure.

Referring now to FIG. 10, an architecture diagram of a multi-customer single application EAC system 1000 is shown. In accordance with certain aspects of the present disclosure, system 1000 may be configured to enable a system user to download a single mobile application to the user's mobile electronic device configured to provide a consistent user experience and single sign-on functionality for multiple, disparate EAC systems. In accordance with certain aspects of the present disclosure, system 1000 may be configured to provide an enhanced user experience and time savings for wireless interface protocols between client devices and EAC devices across multiple disparate EAC systems. In accordance with certain aspects of the present disclosure, system 1000 may comprise an application server 1008 comprising a server application 1010 and a database or datastore 1012. In accordance with certain embodiments, application server 1008 may be communicably engaged with one or more EAC server(s) 1020 to send and receive access/authorization credentials for a first plurality of EAC devices 1006*a-n* and/or a second plurality of EAC devices 1018*a-n*. Application server 1008 may be communicably engaged with a first client device 1002 and a second client device 1004 via a network interface 1016. In accordance with certain aspects of the present disclosure, client device 1002 may be associated with an owner or tenant user of one or more EAC system and client device 1004 may be associated with a non-owner (e.g., service technician) user of the one or more EAC system (e.g., EAC devices 1006*a-n* and/or EAC devices 1018*a-n*). In accordance with certain aspects of the present disclosure, client device 1002 may comprise a multi-customer EAC application 1014 installed thereon and client device 1004 may comprise a multi-customer EAC application 1014' installed thereon. In accordance with certain aspects of the present disclosure, multi-customer EAC application 1014 and multi-customer EAC application 1014' may be configured as client-side instances of server application 1010. An instance of multi-customer EAC application 1014 may comprise graphical user interface elements and features configured for an owner or tenant user role. An instance of multi-customer EAC application 1014' may comprise graphical user interface elements and features configured for a non-owner (e.g., service technician) user role. In accordance with certain aspects of the present disclosure, first client device 1002 and second client device 1004 may be communicably engaged with application server 1008 via one or more data transfer protocols of multi-customer EAC application 1014 and multi-customer EAC application 1014', respectively, to receive a plurality of authorization data for the first plurality of EAC devices 1006a-n and/or the second plurality of EAC devices 1018a-n. In accordance with certain aspects of the present disclosure, multi-customer EAC application 1014 and multi-customer EAC application 1014' may comprise a data store configured to embed the plurality of authorization data in the non-transitory computer-readable memory device of first client device 1002 and second client device 1004. In accordance with certain aspects of the present disclosure, application server 1008 may receive the plurality of authorization data for EAC devices 1006a-n and/or EAC devices 1018a-n from EAC server 1020.

In accordance with various aspects of the present disclosure, an owner user may configure one or more authorization and access parameters for a non-owner user via an instance of multi-customer EAC application 1014. A non-owner user may establish a data transfer interface with EAC devices 1006a-n and/or EAC devices 1018a-n via an instance of multi-customer EAC application 1014'. In accordance with certain aspects of the present disclosure, the first plurality of EAC devices 1006a-n may be located at a first secured site or location and the second plurality of EAC devices 1018a-n may be located at a second secured site or location. In accordance with certain aspects of the present disclosure, a non-owner user may approach a first EAC device, e.g., EAC device 1006a, at a first secured site and launch an instance of multi-customer EAC application 1014'. Multi-customer EAC application 1014' may be operably configured to enable client device 1004 to receive a device advertisement from EAC device 1006a and process the device advertisement to identify authorization data for EAC device 1006a from the authorization data stored/embedded in multi-customer EAC application 1014'. Multi-customer EAC application 1014' may be operably configured to configure one or more communications protocols and operational modes to enable the non-owner user to communicate an authorized access command to EAC device 1006a via the instance of multi-customer EAC application 1014'. In accordance with certain aspects of the present disclosure, multi-customer EAC application 1014' may synchronize activity and device data upon establishing the correct system mode and executing a transaction with EAC device 1006a. Once multi-customer EAC application 1014' identifies the correct authorization data for EAC device 1006a and configures the proper operational mode, then all transactions related to that EAC system are securely enclosed in the instance of multi-customer EAC application 1014' until such time as a new EAC system (e.g., the second plurality of EAC devices 1018a-n) is discovered and authorized.

Still referring to FIG. 10, the non-owner user may approach a second EAC device, e.g., EAC device 1018a, at a second secured site and launch the instance of multi-customer EAC application 1014'. Multi-customer EAC application 1014' may be operably configured to enable client device 1004 to receive a device advertisement from the second EAC device 1018a and process the device advertisement to identify authorization data for EAC device 1018a from the authorization data stored/embedded in multi-customer EAC application 1014'. Multi-customer EAC application 1014' may be operably configured to configure one or more communications protocols and operational modes to enable the non-owner user to communicate an authorized access command to EAC device 1018a via the instance of multi-customer EAC application 1014'. In accordance with certain aspects of the present disclosure, multi-customer EAC application 1014' may synchronize activity and device data upon changing the system mode that was previously configured for the first plurality of EAC devices 1006a-n to the correct system mode for the second plurality of EAC devices 1018a-n to execute a transaction with EAC device 1018a. Upon updating and configuring the new operational mode, then all transactions related to the newly configured EAC system are securely enclosed in the instance of multi-customer EAC application 1014' until such time as a new EAC system is discovered and authorized.

Figure 11:
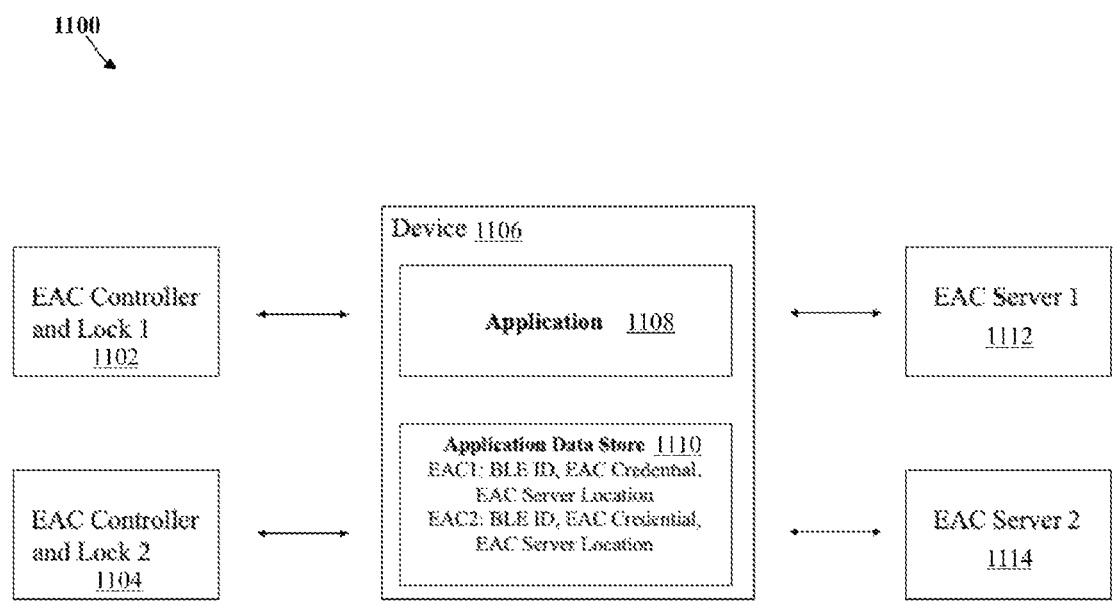
FIG. 11 is a functional block diagram of a multi-customer single application EAC system, in accordance with certain aspects of the present disclosure.

Referring now to FIG. 11, a functional block diagram of a multi-customer single application EAC system 1100 is shown. In accordance with certain aspects of the present disclosure, system 1100 may comprise one or more components or subcomponents of system 1000, as shown and described in FIG. 10. In accordance with certain aspects of the present disclosure, system 1100 may comprise an integrated electronic access control system comprising a mobile end user application configured to enable a consistent user experience and single sign-on functionality across multiple independent EAC systems within a single instance and graphical user interface of the mobile end user application. System 1100 may comprise a client device 1106 communicably engaged with a first EAC Server 1 1112 and a second EAC Server 2 1114 via a first communications protocol and data transfer interface. Client device 1106 may be further communicably engaged with a first EAC Controller and Lock 1 1102 and a second EAC Controller and Lock 2 1104 via a second communications protocol and data transfer interface. Client device 1106 may serve as a broker between first EAC Server 1 1112 and first EAC Controller and Lock 1 1102 and second EAC Server 2 1114 and second EAC Controller and Lock 2 1104. In accordance with certain embodiments, client device 1106 may comprise a mobile computing device such as a smart phone or tablet computer. Client device 1106 may comprise an end user application 1108 comprising an application data store 1110. Application data store 1110 may be configured to store and embed authorization data for first EAC Controller and Lock 1 1102 and second EAC Controller and Lock 2 1104. Authorization data may include, for example, device ID (e.g., BLE ID), EAC credentials (e.g., access codes) and EAC server location. End user application 1108 may be configured to enable a consistent user experience and single sign-on functionality for multiple independent EAC systems (e.g., EAC Controller and Lock 1 1102 and EAC Controller and Lock 2 1104). End user application 1108 may comprise a plurality of program code configured to execute one or more operations of a multi-customer electronic access control system and method, as further described in FIGS. 12-15 below. End user application 1108 may be configured to execute one or more operations, as further described in FIGS. 12-15 below, to configure a communications interface between EAC Controller and Lock 1 1102 and EAC Controller and Lock 2 1104. In accordance with various embodiments, application 1108 is configured to execute one or more commands or operations for: (1) translating an embedded EAC system ID from the EAC system, such as the BLE broadcast message or WIFI SSID that triggers the application to utilizes authorization for that system and server location; (2) running deeplink commands from a browser page, text message, email, or other means that switches the mode of the application to the right EAC system; and (3) receiving a user-generated input comprising authorization information for the right EAC system.

In accordance with certain embodiments, application data store 1110 is configured to encrypt all identity, authorization and server access information so that mobile electronic device 1106 can be locally validated and interfaced with by EAC Controller and Lock 1 1102 and EAC Controller and Lock 2 1104. In accordance with certain aspects of the present disclosure, application 1108 is configured to execute one or more commands or operations to add one or more system identification values into an existing encrypted access code, including: customer ID, user ID, manufacture ID, product ID, customer organization ID, site group ID, and/or site ID. In accordance with certain aspects of the present disclosure, application 1108 is configured to execute one or more commands or operations for one or more of the following.

1. Permanently setting the number of an encrypted Access Code (AC) digits to 10 (do not allow to be changed, and force 10 when configuring access control unit settings). This can be less or greater than 10 but must be specified and consistent prior to use.
2. Defining variables to store IDs: customer id, user id, manufacture id, product id, customer organization id and site group id that will be encrypted into an existing encrypted access code
3. Embedding ID's; optionally according to the following algorithm: (a) Encode 10 decimal digit Access Code with all the ID's with different value ranges 0-X into a multidigit decimal AC; (b) Convert the 10-digit AC to a 34-digit bit field; (c) Use X bits for EAC ID; (d) Encode into a bit field using a repeatable pattern of two Access Code bits then one customer ID bit until the customer ID bits run out, then use user bits (last digit is check bit and should be even parity—even number of 1 bits set); (e) convert the Y digit bitfield back to Y digit decimal.

Figure 12:
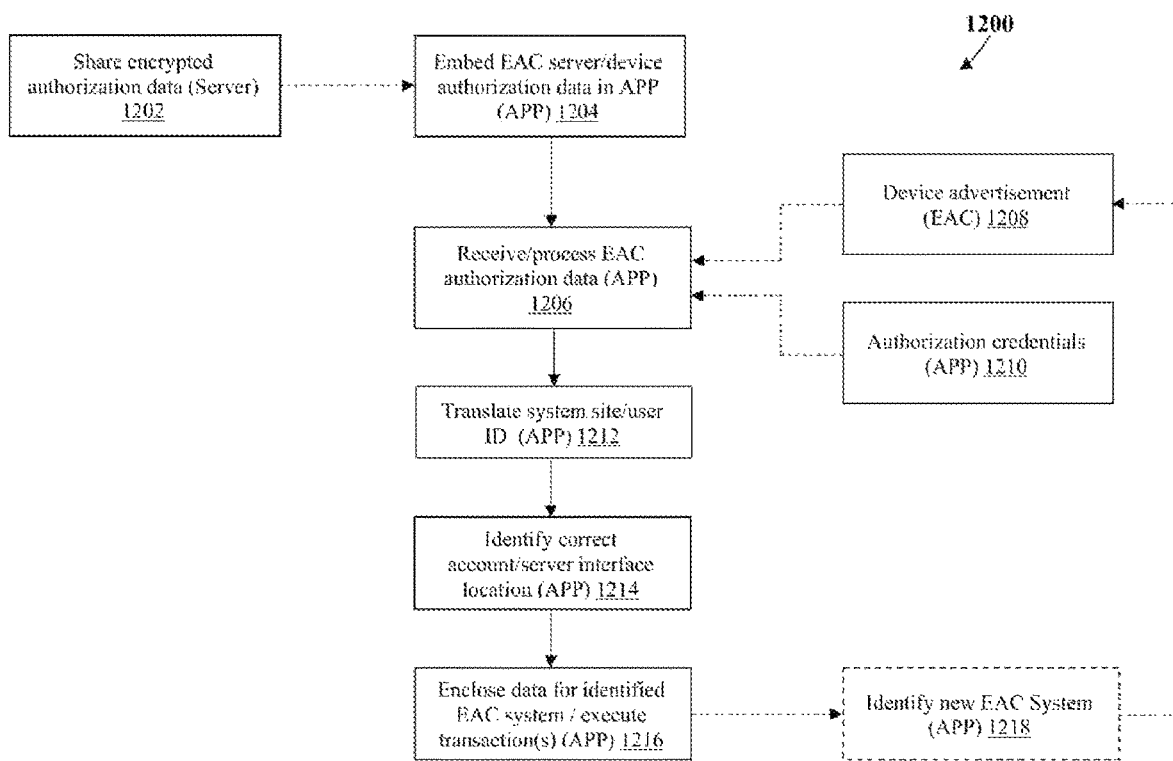
FIG. 12 is a process flow diagram of a multi-customer single application EAC system, in accordance with certain aspects of the present disclosure.

Referring now to FIG. 12, a process flow diagram of a routine 1200 within a multi-customer single application EAC system is shown. In accordance with certain aspects of the present disclosure, routine 1200 may be executed within one or more of system 200 (as shown and described in FIG. 2), system 300 (as shown and described in FIG. 3), system 1000 (as shown and described in FIG. 10), and/or system 1100 (as shown and described in FIG. 11). In accordance with certain aspects of the present disclosure, routine 1200 may comprise one or more steps or operations for sharing EAC server and EAC device authorization data for at least one EAC system via an encrypted data transfer interface between an application server and an EAC application executing on a client device (Step 1202). Routine 1200 may proceed by executing one or more steps or operations, within the EAC application, for embedding the EAC server and the EAC device authorization data for the at least one EAC system within a datastore of the EAC application (Step 1204). Routine 1200 may proceed by executing one or more steps or operations, within the EAC application, processing EAC device authorization data received via the EAC application at the client device (Step 1206). EAC device authorization data may be received via at least one EAC device communication (e.g., BLE advertisement) from at least one EAC device in proximity to the client device (Step 1208). Alternatively, or additionally, EAC device authorization data may be received via a user-generated input receive at a graphical user interface of the EAC application (Step 1210). Routine 1200 may proceed by executing one or more steps or operations for translating an EAC system site ID or user ID from the EAC device authorization data (Step 1212). Routine 1200 may proceed by executing one or more steps or operations for identifying the correct EAC account and server interface location for the EAC device using the authorization data embedded in the datastore of the EAC application (Step 1214). Routine 1200 may proceed by executing one or more steps or operations for configuring the EAC application into the appropriate operational mode by enclosing data for the correct EAC system in the EAC application based on an output of step 1214 and executing any transactions for that EAC system within an instance of the EAC application (Step 1216). The EAC application will maintain its operational configuration until a new EAC system is detected (Step 1218) either via a new device advertisement (Step 1208) or a user-generated input comprising new authorization credentials (Step 1210).

Figure 13:
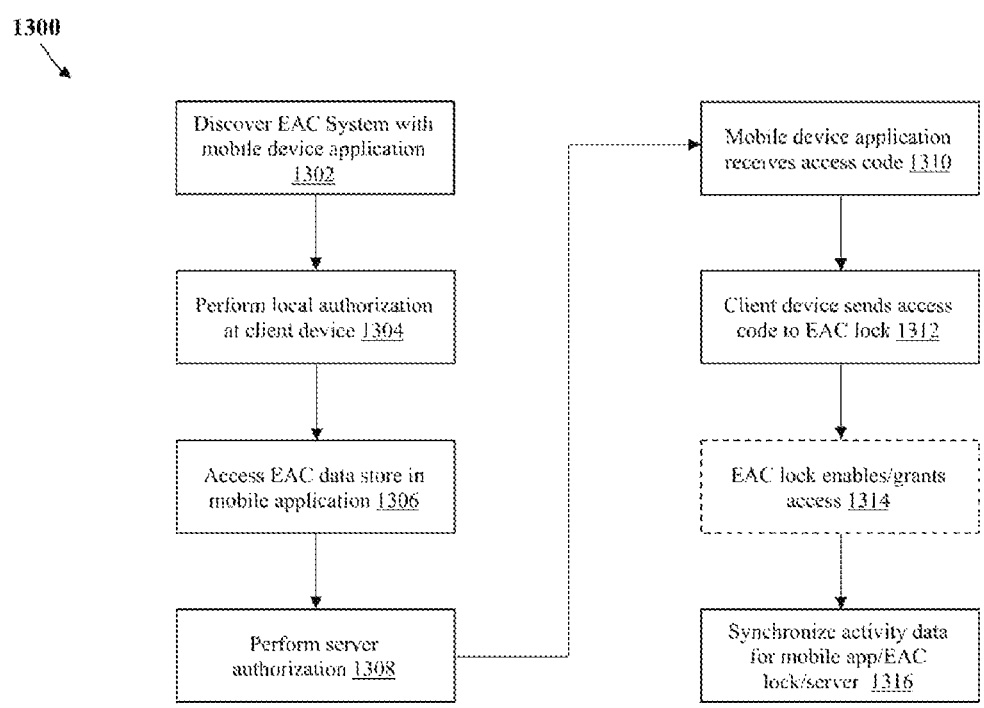
FIG. 13 is a process flow diagram of a multi-customer single application EAC system, in accordance with certain aspects of the present disclosure.

Referring now to FIG. 13, a process flow diagram of a routine 1300 for a multi-customer single application EAC system is shown. In accordance with certain aspects of the present disclosure, routine 1300 may be executed within one or more of system 200 (as shown and described in FIG. 2), system 300 (as shown and described in FIG. 3), system 1000 (as shown and described in FIG. 10), and/or system 1100 (as shown and described in FIG. 11). In accordance with certain aspects of the present disclosure, routine 1300 may be successive or sequential to one or more steps or sub-steps of routine 1200 (as shown and described in FIG. 12). Routine 1300 may be initiated upon executing one or more steps or operations for discovering a specified EAC system, comprising at least one EAC controller and lock, within an instance of a multi-customer EAC application executing on a client device (e.g., a smartphone or tablet computer) (Step 1302). Routine 1300 may proceed by executing one or more steps or operations for performing local authorization for the specified EAC system at the client device via the multi-customer EAC application (Step 1304). The local authorization may include one or more steps or operations for accessing one or more embedded authorization data from a data store of the multi-customer EAC application (Step 1306) and/or establishing a data transfer interface with at least one application server to receive EAC authorization and server data. Routine 1300 may proceed by executing one or more steps or operations for performing server authorization for the specified EAC system and configuring an operational mode of the multi-customer EAC application (Step 1308). In accordance with certain aspects of the present disclosure, routine 1300 may proceed by executing one or more steps or operations for receiving the access code for the specified EAC system (Step 1310) and sending, via the client device, an access code to an EAC device/controller for the specified EAC system (Step 1312). The EAC device/controller for the specified EAC system enables/grants access to the authorized user (Step 1314) and routine 1300 continues by executing one or more steps or operations for synchronizing activity data for the multi-customer EAC application and the EAC device/controller with the application server (Step 1316).

Figure 14:
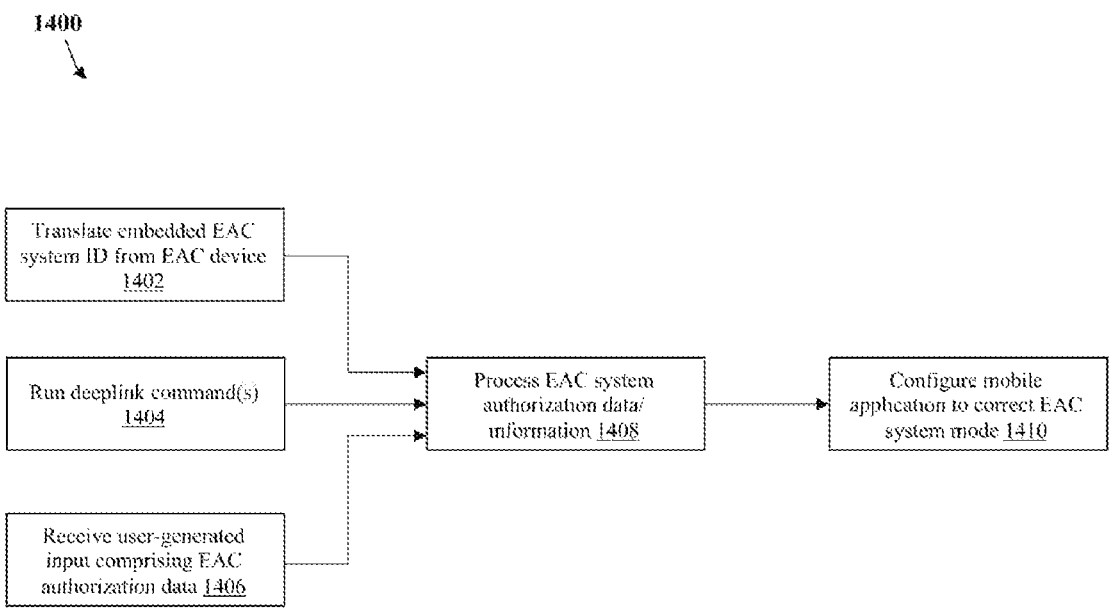
FIG. 14 is a functional block diagram of a multi-customer single application EAC system, in accordance with certain aspects of the present disclosure.

Referring now to FIG. 14, a functional block diagram of a routine 1400 within a multi-customer single application EAC system is shown. In accordance with certain aspects of the present disclosure, routine 1400 may be executed within one or more of system 200 (as shown and described in FIG. 2), system 300 (as shown and described in FIG. 3), system 1000 (as shown and described in FIG. 10), and/or system 1100 (as shown and described in FIG. 11). In accordance with certain aspects of the present disclosure, routine 1400 may be successive or sequential to one or more steps or sub-steps of routine 1200 (as shown and described in FIG. 12) and/or one or more steps or sub-steps of routine 1300 (as shown and described in FIG. 13). In accordance with certain aspects of the present disclosure, routine 1400 may comprise a subroutine for configuring a multi-customer EAC application to the correct system mode for each disparate EAC system and/or EAC devices. In accordance with certain aspects of the present disclosure, routine 1400 may comprise one or more steps or operations for translating an embedded EAC system ID from the EAC system, such as the BLE broadcast message or WIFI SSID that triggers the application to utilize authorization for that system and server location (Step 1402); running deeplink commands from a browser page, text message, email, or other means that switches the mode of the application to the right EAC system (Step 1404); and/or receiving a user-generated input comprising authorization information for the right EAC system (Step 1406). In response to executing one or more of steps 1402-1406, routine 1400 may proceed by performing one or more steps or operations for processing the EAC system authorization data and/or server information within the multi-customer EAC application (Step 1408) and configuring the multi-customer EAC application to the correct EAC system mode for conducting one or more transaction with a subject EAC system and/or EAC devices (Step 1410).

Figure 15:
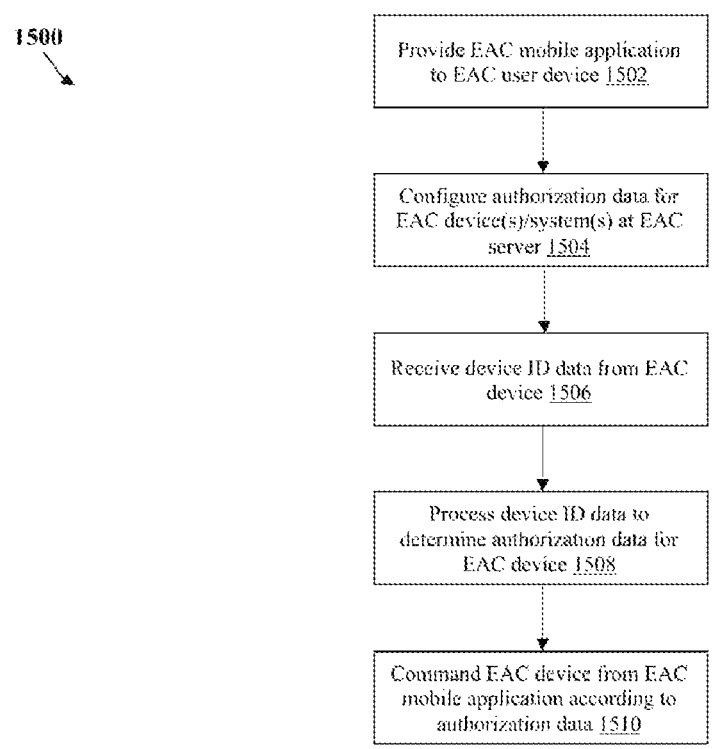
FIG. 15 is a process flow diagram of a multi-customer single application EAC method, in accordance with certain aspects of the present disclosure.

Referring now to FIG. 15, a process flow diagram of a multi-customer single application EAC method 1500 is shown. In accordance with certain aspects of the present disclosure, routine 1500 may be executed within one or more of system 200 (as shown and described in FIG. 2), system 300 (as shown and described in FIG. 3), system 1000 (as shown and described in FIG. 10), and/or system 1100 (as shown and described in FIG. 11). In accordance with certain aspects of the present disclosure, routine 1500 may be successive or sequential to one or more steps or sub-steps of routine 1200 (as shown and described in FIG. 12) and/or one or more steps or sub-steps of routine 1300 (as shown and described in FIG. 13) and/or one or more steps or sub-steps of routine 1400 (as shown and described in FIG. 14). Method 1500 may be initiated upon performing one or more steps or operations for providing, to a mobile electronic device via at least one server, a mobile application comprising a graphical user interface configured to receive one or more user-generated inputs for configuring an access command to at least one electronic access control device in a plurality of electronic access control devices and a data store configured to store a plurality of authorization data for the plurality of electronic access control devices (Step 1502). Method 1500 may proceed by performing one or more steps or operations for configuring, with the at least one server, the plurality of authorization data for the plurality of electronic access control devices (Step 1504). In accordance with certain aspects of the present disclosure, the plurality of authorization data may include user authorization data and device authorization data for the plurality of electronic access control devices. Method 1500 may proceed by performing one or more steps or operations for receiving, with the mobile electronic device via the mobile application, a device advertisement from a first electronic access control device (Step 1506). In accordance with certain aspects of the present disclosure, the device advertisement comprises device identification data for the first electronic access control device. Method 1500 may proceed by performing one or more steps or operations for processing, with the mobile electronic device via the mobile application, the device advertisement to determine a first set of authorization data from the plurality of authorization data (Step 1508). In accordance with certain aspects of the present disclosure, the first set of authorization data is associated with the first electronic access control device. Method 1500 may proceed by performing one or more steps or operations for commanding, with the mobile electronic device via the mobile application, a first transaction for the first electronic access control device (Step 1510). In accordance with certain aspects of the present disclosure, the first transaction comprises the first set of authorization data.

In accordance with certain aspects of the present disclosure, still referring to FIG. 15, method 1500 may include one or more steps or operations for receiving, with the mobile electronic device via the mobile application, a second device advertisement from a second electronic access control device, wherein the second device advertisement comprises device identification data for the second electronic access control device. In accordance with certain aspects of the present disclosure, method 1500 may include one or more steps or operations for processing, with the mobile electronic device via the mobile application, the second device advertisement to determine a second set of authorization data from the plurality of authorization data, wherein the second set of authorization data is associated with the second electronic access control device. In accordance with certain aspects of the present disclosure, method 1500 may include one or more steps or operations for commanding, with the mobile electronic device via the mobile application, a second transaction for the second electronic access control device, wherein the second transaction comprises the second set of authorization data. In accordance with certain aspects of the present disclosure, method 1500 may include one or more steps or operations for receiving, with the mobile electronic device via the mobile application, a user-generated input comprising user authorization data for one or more user roles.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A system comprising:
   at least one remote server;
   at least one electronic access control device; and
   a mobile electronic device communicably engaged with the at least one remote server and the at least one electronic access control device, the mobile electronic device comprising:
      at least one computer processor configured to execute computer program instructions; and
      a non-transitory computer-readable memory device communicably engaged with the at least one computer processor and having computer program instructions stored thereon that, when executed, cause the at least one computer processor to perform operations comprising:
         receive a plurality of authorization data for the at least one electronic access control device from the at least one remote server;
         store the plurality of authorization data for the at least one electronic access control device in the non-transitory computer-readable memory device;
         receive a device advertisement from the at least one electronic access control device, wherein the at least one electronic access control device is located at a specified secure location;
         process the device advertisement to identify authorization data for the at least one electronic access control device from the plurality of authorization data; and
         communicate an authorized access command to the at least one electronic access control device in response to successfully identifying the authorization data for the at least one electronic access control device from the plurality of authorization data.

2. The system of claim 1 wherein the plurality of authorization data for the at least one electronic access control device comprises authorized user identification data.

3. The system of claim 1 wherein the plurality of authorization data for the at least one electronic access control device comprises authorized server access data.

4. The system of claim 1 wherein the operations further comprise receiving, via the at least one remote server, user authorization data for the at least one electronic access control device from an owner user or a tenant user associated with the specified secure location.

5. The system of claim 1 wherein the operations further comprise receiving a second device advertisement from a second electronic access control device.

6. The system of claim 5 wherein the operations further comprise processing the second device advertisement from the second electronic access control device to identify a second set of authorization data for the second electronic access control device from the plurality of authorization data.

7. The system of claim 1 wherein the device advertisement comprises device identification data for the at least one electronic access control device.

8. The system of claim 1 wherein the plurality of authorization data for the at least one electronic access control device is embedded in a data store residing on the non-transitory computer-readable memory device of the mobile electronic device.

9. The system of claim 8 wherein the plurality of authorization data for the at least one electronic access control device is encrypted.

10. A method comprising:
    providing, to a mobile electronic device via at least one server, a mobile application comprising a graphical user interface configured to receive one or more user-generated inputs for configuring an access command to at least one electronic access control device in a plurality of electronic access control devices and a data store configured to store a plurality of authorization data for the plurality of electronic access control devices;
    configuring, with the at least one server, the plurality of authorization data for the plurality of electronic access control devices, wherein the plurality of authorization data comprises user authorization data and device authorization data;
    receiving, with the mobile electronic device via the mobile application, a device advertisement from a first electronic access control device, wherein the device advertisement comprises device identification data for the first electronic access control device;
    processing, with the mobile electronic device via the mobile application, the device advertisement to determine a first set of authorization data from the plurality of authorization data, wherein the first set of authorization data is associated with the first electronic access control device; and
    commanding, with the mobile electronic device via the mobile application, a first transaction for the first electronic access control device, wherein the first transaction comprises the first set of authorization data.

11. The method of claim 10 further comprising receiving, with the mobile electronic device via the mobile application, a second device advertisement from a second electronic access control device, wherein the second device advertisement comprises device identification data for the second electronic access control device.

12. The method of claim 11 further comprising processing, with the mobile electronic device via the mobile application, the second device advertisement to determine a second set of authorization data from the plurality of authorization data, wherein the second set of authorization data is associated with the second electronic access control device.

13. The method of claim 12 further comprising commanding, with the mobile electronic device via the mobile application, a second transaction for the second electronic access control device, wherein the second transaction comprises the second set of authorization data.

14. The method of claim 13 wherein the first electronic access control device is associated with a first electronic access control system and the second electronic access control device is associated with a second electronic access control system, wherein the first electronic access control system is different from the second electronic access control system.

15. The method of claim 10 wherein the device advertisement from the first electronic access control device comprises a Bluetooth Low Energy broadcast message.

16. The method of claim 10 further comprising receiving, with the mobile electronic device via the mobile application, a user-generated input comprising user authorization data for one or more user roles.

17. The method of claim 16 wherein the one or more user roles comprise an owner user role and a non-owner user role.

18. The method of claim 10 wherein the plurality of authorization data further comprises server access data.

19. The method of claim 18 wherein processing the device advertisement further comprises executing, with the mobile application, at least one operation for establishing a data transfer interface between the mobile application and an authorized server.

20. A non-transitory computer-readable medium storing executable computer program instructions, the instructions executable to command at least one processor to perform operations comprising:
   providing a mobile application comprising a graphical user interface configured to receive one or more user-generated inputs for configuring an access command to at least one electronic access control device in a plurality of electronic access control devices and a data store configured to store a plurality of authorization data for the plurality of electronic access control devices;
   configuring the plurality of authorization data for the plurality of electronic access control devices, wherein the plurality of authorization data comprises user authorization data and device authorization data;
   receiving a device advertisement from a first electronic access control device, wherein the device advertisement comprises device identification data for the first electronic access control device;
   processing the device advertisement to determine a first set of authorization data from the plurality of authorization data, wherein the first set of authorization data is associated with the first electronic access control device; and
   commanding a first transaction for the first electronic access control device, wherein the first transaction comprises the first set of authorization data.

* * * * *